Figure 1:
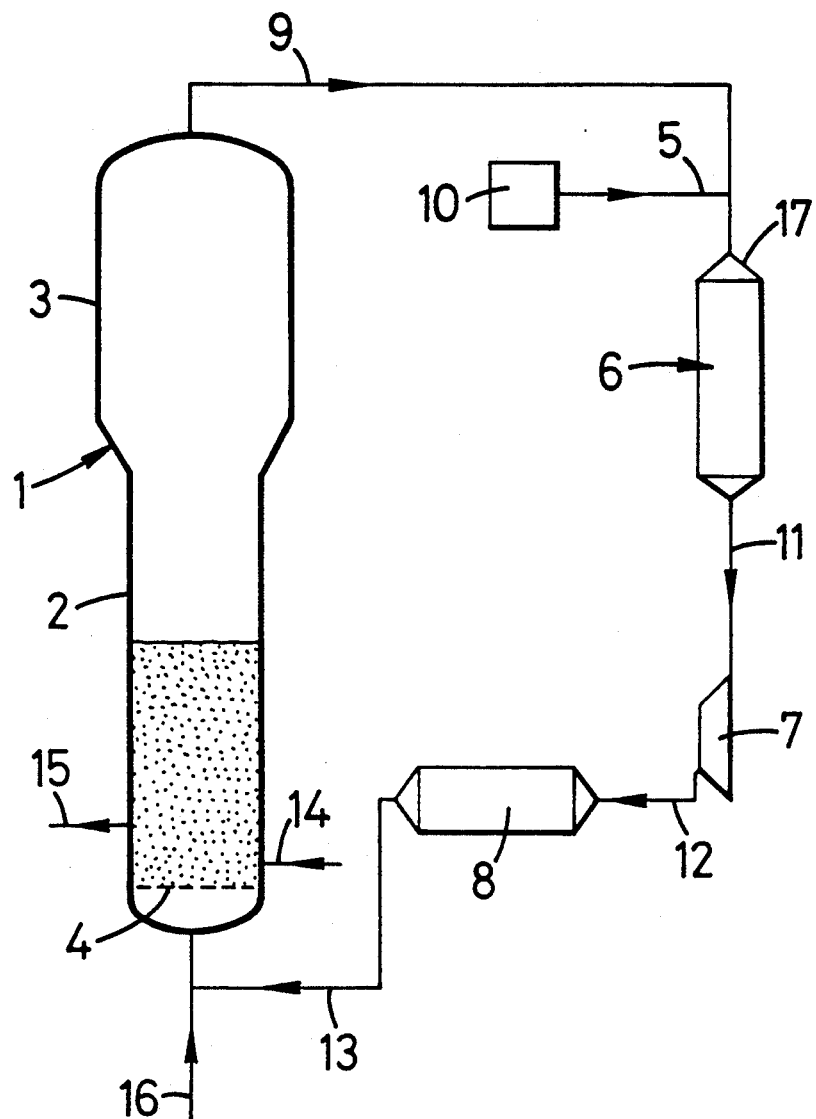

United States Patent [19]

Chinh et al.

[11] Patent Number: 5,266,276
[45] Date of Patent: Nov. 30, 1993

[54] APPARATUS FOR THE GAS-PHASE POLYMERIZATION OF OLEFINS IN A FLUIDIZED-BED REACTOR

[75] Inventors: Jean-Claude Chinh; Andre Dumain, both of Martigues, France

[73] Assignee: BP Chemicals Limited, London, England

[21] Appl. No.: 28,626

[22] Filed: Mar. 9, 1993

Related U.S. Application Data

[60] Continuation of Ser. No. 680,060, Apr. 3, 1991, abandoned, which is a division of Ser. No. 369,259, Jun. 21, 1989, Pat. No. 5,028,670.

[30] Foreign Application Priority Data

Jul. 15, 1988 [FR] France ................. 88 09778

[51] Int. Cl.$^5$ ........................... F27B 15/14
[52] U.S. Cl. .................. 422/132; 422/235; 422/139; 526/901
[58] Field of Search ........... 422/146, 235, 139, 132; 526/901

[56] References Cited

U.S. PATENT DOCUMENTS 4,012,573  3/1977  Trieschmann et al. ............. 526/88
4,390,669  6/1983  Morita et al. ..................... 526/88
4,951,613  8/1990  Harandi et al. ................... 422/138

Primary Examiner—Joseph L. Schofer
Assistant Examiner—Tom Weber
Attorney, Agent, or Firm—Brooks Haidt Haffner & Delahunty

[57] ABSTRACT

The present invention relates to a process and apparatus for the gas-phase polymerization of olefins in a fluidized-bed reactor maintained at a temperature T1. A gaseous reaction mixture comprising the olefins to be polymerized passes through the reactor and is recycled to the reactor by means of a recycling line comprising successively a first heat transfer means, a compressor and a second heat transfer means. The present invention consists in introducing a readily volatile liquid hydrocarbon into the inlet of the first heat transfer means or into the recycling line, upstream and in the vicinity of the first heat transfer means. The first heat transfer means cools the gaseous reaction mixture to a temperature T2, below T1, while volatilizing the readily volatile hydrocarbon and without condensing a constituent of the gaseous reaction mixture. The second heat transfer means cools the gaseous reaction mixture to a temperature T3, below T2, for maintaining the fluidized-bed at the desired temperature T1.

7 Claims, 1 Drawing Sheet

APPARATUS FOR THE GAS-PHASE POLYMERIZATION OF OLEFINS IN A FLUIDIZED-BED REACTOR

This application is a continuation of application Ser. No. 07/680,060, filed Apr. 3, 1991 now abandoned, which is a division of application Ser. No. 07/369,259 filed Jun. 21, 1989 now U.S. Pat. No. 5,028,670.

The present invention relates to a process for the gas-phase polymerisation of olefins in a fluidised-bed reactor and to apparatus for carrying out the process.

It is known to polymerise one or more olefins in the gas phase in a fluidised-bed reactor in which polymer particles in the process of forming are kept in the fluidised state by means of a gaseous reaction mixture circulating in a rising stream and containing the olefin or olefins to be polymerised. The polymerisation reaction is generally carried out in the presence of a catalyst of the Ziegler-Natta type or a catalyst based on chromium oxide. The catalyst is introduced into the fluidised-bed reactor continuously or intermittently while the polymer produced is drawn off from the reactor, also continuously or intermittently. The gaseous mixture circulating in the fluidised-bed reactor is only in contact with the catalyst for a limited time, which is generally leas than thirty seconds or so. Thus only a fraction of the olefins introduced into the reactor is able to react, and so it is necessary in practice to recycle the gaseous mixture into the reactor. Furthermore, the polymerisation of olefins is an exothermic reaction and the heat produced must be removed so as to maintain a constant temperature in the fluidised-bed.

French patent no. 1 566 967 has disclosed a process for the gas-phase polymerisation of olefins in a fluidised-bed reactor provided with heat transfer means which are arranged inside the fluidised bed for the purpose of cooling it. The reactor is surmounted by a tranquillisation chamber, the purpose of which is to reduce the quantity of fine particles entrained with the gaseous reaction mixture leaving through the top of the reactor. The gaseous mixture is re-introduced into the bottom of the reactor by means of a recycling line. The latter includes, in succession in the direction of flow of the gaseous mixture, a cyclone, a filter, a cooling and gas/-liquid separation device, the particular purpose of which is to liquefy condensable compounds contained in the gaseous reaction mixture and separate them from the said mixture, a compressor for circulating and recycling the gasoues reaction mixture, and a heat exchanger capable of heating or cooling the gaseous reaction mixture, as required, before it is reintroduced into the reactor. Furthermore, a polymerisation activator, such as an organoaluminium compound, can be introduced directly into the recycling line at a point located between the compressor and the heat exchanger capable of heating or cooling. It has been found that even when a dust separator is used, it is not very effective at stopping the finest particles. Such particles are generally very active in polymerisation since they consist of catalyst and debris of growing polymer particles. Consequently, the fine particles can rapidly deposit on the surfaces of the heat exchanger, more particularly in the entrance and in the first portion of the heat exchanger. They can continue to react with the olefins, be heated to their melting point and partially or totally block the exchanger. It has also been observed that the cooling and gas/liquid separation device, which is arranged upstream of the compressor and whose main purpose is to condense some of the constituents of the gaseous reaction mixture, cannot totally separate the condensed products from the gaseous mixture. This results in excessive wear of the compressor, which sucks in a gaseous mixture containing a liquid in the form of fine droplets. Furthermore, it is known that a gas/liquid separation device considerably increases the pressure loss in the recycling line and hence the energy consumption of the compressor.

A process for the gas-phase polymerisation of olefins has now been found which uses apparatus such as that shown schematically in FIG. 1, comprising, in particular, a fluidised-bed reactor and a line for recycling the gaseous reaction mixture leaving through the top of the reactor. The recycling line includes, in particular, a compressor, two heat transfer means and a line for introducing a readily volatile liquid hydrocarbon, which are arranged in such a way as to avoid the above-mentioned disadvantages. In particular, the fine particles of polymer or catalyst carried out of the reactor no longer disturb the operation of the compressor and the heat transfer means. It is found that the gaseous reaction mixture to be recycled can also contain readily condensable hydrocarbons without thereby damaging or interfering with the apparatus and particularly the compressor, whose service life is greatly increased. It is also found that the time interval between successive cleaning operations on the heat transfer means is considerably lengthened.

The present invention relates to a process for the gas-phase polymerisation of one or more olefins having from 2 to 10 carbon atoms, in a fluidised-bed reactor in the presence of a catalyst system of the Ziegler-Natta type or a catalyst based on chromium oxide, introduced into the reactor continuously or intermittently, the polymer being produced in the fluidised bed at a temperature $T_1$, which is below the melting point of the polymer, and drawn off from the reactor continuously or intermittently, the solid particles of the bed being kept in the fluidised state by means of a gaseous reaction mixture comprising the olefin or olefins to be polymerised, which passes through the reactor in a rising stream, leaves through the top of the reactor and returns into the bottom part of the reactor by means of a recycling line which includes, in succession in the direction of flow of the gaseous reaction mixture, a first heat transfer means, a compressor and a second heat transfer means, characterised in that:

a readily volatile liquid hydrocarbon is introduced either into the inlet of the first heat transfer means or into the recycling line, upstream and in the vicinity of the first heat transfer means, such that the mixture entering the first heat transfer means contains readily volatile hydrocarbon in the liquid state, the gaseous reaction mixture is cooled by the first heat transfer means to a temperature $T_2$, which is below $T_1$ and is such that no gaseous constituent of the said mixture condenses and such that the readily volatile liquid hydrocarbon volatilises in the first heat transfer means and the gaseous reaction mixture to which the readily volatile liquid hydrocarbon has been added is cooled by the second heat transfer means to temperature $T_3$, which is below $T_2$ and is such that the temperature of the fluidised bed is maintained at the desired temperature $T_1$.

The readily volatile liquid hydrocarbon can comprise at least one inert hydrocarbon, which can be selected from alkanes containing from 2 to 7 carbon atoms, in particular n-butane, isobutane, n-pentane, isopentane and n-hexane. The readily volatile liquid hydrocarbon can also comprise at least one olefin, which can be selected from olefins or diolefins containing from 3 to 10 carbon atoms, in particular propylene, but-1-ene, hex-1-ene, 4-methylpent-1-ene and oct-1-ene. It can also be selected from dienes, in particular hexa-1,4-diene and 5-ethylidene-2-norbonene. The readily volatile liquid hydrocarbon can also consist of a mixture of two or more of these materials. It has been observed, surprisingly, that the introduction of a liquid olefin into the gaseous reaction mixture at a hot point of the recycling line, either upstream of the first heat transfer means or at the actual inlet of the latter, does not have the effect of producing a sudden increase in the temperature of the entrained fine particles, which can rise to their softening or melting point, because of an activation of particles containing the catalyst which develops especially when a higher alpha-olefin is added to ethylene. Such an activation is disclosed, for example, in Polymer Science USSR, vol. 22, 1980, pages 448–454.

The gaseous reaction mixture is cooled initially by the first heat transfer means to a temperature T2, which is below the polymerisation temperature T1 in the fluidised bed. The temperature T2 can be at least 10° C., preferably at least 20° C., below T1 provided that constituents of the gaseous reaction mixture are not condensed. Moreover, the temperature T2 is selected such that the readily volatile liquid hydrocarbon is completely volatilised in the first heat transfer means. Thus, the gaseous reaction mixture to which the readily volatile liquid hydrocarbon has been added leaves the first heat transfer means totally in the gaseous state, which makes it possible to operate the compressor satisfactorily. In other words, the temperature T2 is selected above the dew point temperature, Tdp, of the gas mixture circulating at the outlet of the first heat transfer means which comprises the gaseous reaction mixture and the readily volatile liquid hydrocarbon in the gaseous state. More particularly, the temperature T2 can be selected such that:

$$T2 > Tdp + 2° C.$$

and preferably such that $$T2 > Tdp + 5° C.$$

Furthermore, the fine particles entrained in the gaseous reaction mixture are themselves cooled to the temperature T2, which makes it possible to prevent them from softening or melting in the compressor, where the temperature generally rises a few degrees due to compression of the gas mixture. Moreover, the compressor is fed with a cooled gas mixture, affording an appreciable reduction in its energy comsumption.

The gaseous reaction mixture containing the readily volatile liquid hydrocarbon in the gaseous state is then cooled a second time by the second heat transfer means to a temperature T3, which is below T2. More particularly, the temperature T3 can be at least 30° C., preferably at least 40° C., below the polymerisation temperature T1 in the fluidised bed. As the gaseous reaction mixture is reintroduced directly into the bottom part of the fluidised-bed reactor at the temperature T3, the difference between the temperatures T3 and T1 largely determines the polymer production capacity of the reactor. More particularly, the temperature T3 can be below the dew point temperature of the gas mixture consisting of the gaseous reaction mixture and the readily volatile liquid hydrocarbon.

The polymerisation reaction is generally carried out under a pressure of between 0.5 and 5 MPa and at a temperature T1 which is below the melting point of the polymer and preferably is below the softening point or the sintering point of the polymer, in particular the temperature T1 is between 0° C. and 150° C., preferably between 30° C. and 120° C. The gaseous reaction mixture which passes through the fluidised-bed polymerisation reactor, and which is recycled, can contain, in addition to the olefin or olefins to be polymerised, dienes, hydrogen and an inert gas selected, for example, from nitrogen, methane, ethane, propane, butane, isobutane, pentane, isopentane and hexane. It passes through the fluidised bed in a rising stream at a fluidisation speed which is generally between 2 and 8 times the minimum fluidisation speed, in particular between 0.3 and 0.8 m/s and preferably between 0.4 and 0.7 m/s. The fluidised bed consists of polymer particles in the process of forming, with weight-average diameter of between 0.3 and 2 Mm.

The process according to the invention is particularly suitable for the manufacture of polyolefins in the gas phase by the polymerisation of ethylene or propylene or by the copolymerisation of a mixture of two or more olefins such as ethylene, propylene, but-1-ene, hex-1-ene and 4-methylpent-1-ene, in the presence of a catalyst or catalyst system of high activity. The catalyst system can be of the Ziegler-Natta type and contain a solid catalyst consisting essentially of atoms of magnesium, of a halogen such as chlorine or bromine, and of at least one transition metal such as titanium, vanadium or zirconium, and a cocatalyst based on an organometallic compound of a metal belonging to group II or III of the Periodic Table of the elements, such as aluminium or zinc. It is also possible to use a catalyst of high activity based on chromium oxide, associated with a granular support based on a refractory oxide such as silica, alumina or aluminium silicate, and activated by a heat treatment at a temperature of at least 250° C. and at most the temperature at which the granular support may start to sinter, preferably at a temperature of between 350° C. and 1000° C.

The catalyst or catalyst system of high activity can be used direct, as such, or in the form of a prepolymer. This conversion to prepolymer is generally carried out by bringing the catalyst or catalyst system into contact with one or more olefins in amounts such that the prepolymer contains between 0.002 and 10 millimol of transition metal or chromium per gram. The ingredients can also be brought into contact in the presence of an organometallic compound of metal belonging to group II and III or the Periodic Table of the elements, in an amount such that the atomic ratio of the amount of metal in the said organometallic compound to the amount of transition metal or chromium is between 0.1 and 50, preferably between 0.5 and 20. The catalyst or catalyst system of high activity, used direct or after a prepolymerisation step, is introduced into the fluidised-bed reactor.

The present invention also relates to an apparatus for the gas-phase polymerisation of one or more olefins containing from 2 to 8 carbon atoms comprising a fluidised-bed reactor and a recycling line equipped with a compressor by means of which the gaseous reaction mixture comprising the olefin or olefins to be polymerised leaving the top of the reactor is returned into the bottom part of this reactor, the recycling line being provided with a first heat transfer means arranged between the top of the fluidised-bed reactor and the suction side of the compressor, and with a second heat transfer means arranged between the delivery side of the compressor and the bottom part of the reactor, characterised in that a line for introducing a readily volatile liquid hydrocarbon opens into the inlet of the first heat transfer means or into the recycling line, upstream and in the vicinity of the inlet of the first heat transfer means.

The apparatus therefore comprises a fluidised-bed polymerisation reactor which may be surmounted by a tranquillisation chamber, and a line for recycling the gaseous reaction mixture, which externally joins the top to the bottom part of the reactor and which is provided, in succession in the direction of flow of the gaseous reaction mixture, with an inlet of a line for introducing a readily volatile liquid hydrocarbon, a first heat transfer means, a compressor and a second heat transfer means.

According to the present invention, it has been found suprisingly, that in order to make the heat transfer means and the compressor function satisfactorily, it is essential to use two heat transfer means with one on either side of the compressor and to have a line for introducing a readily volatile liquid hydrocarbon which opens direct into the inlet of the first heat transfer means or into the recycling line at a point located between the top of the fluidised-bed reactor and the first heat transfer means, but in the vicinity of the inlet of the first heat transfer means, and particularly at such a distance from this inlet that the readily volatile liquid hydrocarbon is partially in the liquid state in the said inlet. More particularly, the introduction line opens in the recycling line at a distance from the inlet of the first heat transfer means such that the mean residence time of the readily volatile liquid hydrocarbon added to the gaseous reaction mixture may be less than 1 second, and preferably less than 0.5 second. The readily volatile liquid hydrocarbon then vaporises along the length of the first heat transfer means, as it passes through the actual heat exchange zone, more particularly the first portion of this zone. It then becomes totally incorporated in the gaseous reaction mixture, which leaves the first heat transfer means in the form of a totally gaseous homogeneous mixture.

It has been noted that if the line for introducing the readily volatile liquid hydrocarbon opens into the recycling line at a point which is too far from the inlet of the first heat transfer means, the readily volatile liquid hydrocarbon is completely volatilised before its entrance into the first heat transfer means. The fine particles deposit on the exchange surfaces of the said heat transfer means, which then rapidly loses a large part of its heat exchange capacity and can even become blocked through melting of the fine polymer particles. The distance separating the point of introduction of the readily volatile liquid hydrocarbon into the recycling line and the inlet of the first heat transfer means obviously depends on the nature of the readily volatile liquid hydrocarbon introduced, as well as on the composition, the temperature, the pressure and the speed of the gaseous reaction mixture circulating in the recycling line between the top of the fluidised-bed reactor and the first heat transfer means. In particular, this distance will be the shorter, the more volatile the readily volatile liquid hydrocarbon. It is estimated that this distance can be, for instance, at most 15 to 20 m, preferably 10 to 15 m.

It is also essential that the main function of the first heat transfer means is to cool the gaseous reaction mixture to a temperature such that no constituent of the gaseous reaction mixture condenses and that the readily volatile liquid hydrocarbon volatilises completely. The first heat transfer means comprises no means capable of separating a liquid from a gas. In other words, it is important that the gaseous reaction mixture to which the readily volatile liquid hydrocarbon has been added leaves the first heat transfer means totally in the gaseous state and that it does not disturb the compressor. It is totally surprising to find that the first heat transfer means achieves a state of cleanliness without a gas condensing inside this heat transfer means and without a liquid, formed by condensation, flowing over all the exchange surfaces of the said heat transfer means and washing them.

The purpose of the compressor arranged on the recycling line between the two heat transfer means is to circulate the gaseous reaction mixture in the recycling line and to recycle the said mixture, which constitutes the fluidising gas and rises in a stream inside the fluidised-bed reactor, into the said reactor. It is found that the wear of the compressor is considerably reduced because of the fact that the gaseous mixture arriving at the suction side of the compressor does not contain any liquid in the form of droplets and because the fine particles, carried into the recycling line and cooled with the gaseous reaction mixture in the first heat transfer means, are less likely to melt in the compressor. It is also found that the energy consumption of the compressor is substantially reduced because of the fact that the gaseous reaction mixture arriving at the suction side of the compressor has been cooled beforehand in the first heat transfer means. In addition the recycling line may include a dust separator, such as a cyclone or a filter, and the fluidised-bed reactor may comprise a tranquillisation zone. However, these devices are not necessary.

The main function of the second heat transfer means is to cool the gaseous reaction mixture to the desired temperature so that the production of polymer in the fluidised-bed reactor takes place under the desired conditions. In particular, the said second heat transfer means can be operated with condensing one or more constituents of the gaseous reaction mixture and/or the readily volatile liquid hydrocarbon. If appropriate, means capable of separating a liquid from the gaseous mixture, and means for recycling this liquid into the fluidised-bed reactor, may be associated with the second heat transfer means.

The heat transfer means used in the present invention can consist of heat exchangers of known type, which can be plate exchangers or, preferably, tube exchangers, comprising an inlet zone, also called an inlet box, a chamber, generally of cylindrical shape, containing plates or tubes uniformly spaced out inside this chamber, and an outlet zone, also called an outlet box. The line for introducing the readily volatile liquid hydrocarbon can open particularly in the inlet zone of the first heat transfer means. The exchangers used are designed and/or operated for removing the quantity of heat produced by the polymerisation reaction.

It has further been observed that the apparatus of the present invention can be used satisfactorily for the manufacture of a very wide range of polyolefins. More particularly the ratio between the heat exchange capacities of the first and second heat transfer means is between 20/80 and 70/30 and preferably between 30/70 and 60/40. Under these conditions, it is possible to manufacture, for example, a high density polyethylene or a copolymer of ethylene and at least one alpha-olefin containing from 3 to 10 carbon atoms, with a density of less than 0.930.

The fluidised-bed reactor generally consists of a vertical cylinder which may be surmounted by a tranquillisation chamber whose cross-section is larger than that of the cylinder. In its bottom part, the reactor can include a fluidised grid which defines, in the reactor space situated underneath it, a chamber for admitting the gaseous reaction mixture circulating in the recycling line.

The present process and apparatus give great advantages, since the heat exchange means can be kept clean and provide a high efficiency during a long time of use. Moreover, the wear of the compressor is reduced, since the gaseous reaction mixture to be recycled does not contain droplets and the fine particles entrained by the gaseous reaction mixture cannot melt and settle in the various elements of the compressor. These great advantages can be obtained without undesirably increasing the pressure drop of the recycling line. A substantial reduction of the energy consumption can furthermore be obtained for the compressor.

FIG. 1 schematically represents apparatus for the gas-phase polymerisation of olefins. The apparatus includes a fluidised-bed reactor (1) consisting of a vertical cylinder (2) surmounted by a tranquillisation chamber (3) and provided at its bottom part with a fluidisation grid (4). It also comprises a line (9) for recycling the gaseous mixture, which includes, in succession, the inlet of a line (5) for introducing a readily volatile liquid hydrocarbon coming from a storage chamber (10), a first tube heat exchanger (6) provided with an inlet (17), a compressor (7) and a second tube heat exchanger (8). The various elements of the recycling line, and the fluidised-bed reactor (1), are joined together by the pipes (9), (11), (12) and (13). The pipe (13) links the heat exchanger (8) to the bottom part of the reactor (1), underneath the fluidisation grid (4). The line (14) makes it possible to feed the reactor (1) with a catalyst or catalyst system. The polyolefin particles manufactured are discharged from the reactor (1) through the line (15). The line (16), which opens into the line (13), is a line for feeding the constituents of the gaseous reaction mixture, enabling the composition and pressure of this gaseous reaction mixture to be kept constant.

The invention is illustrated by the following Examples.

EXAMPLE 1

The process is carried out in apparatus substantially as represented schematically in FIG. 1 with the exception that the recycling line (9) is equipped with a cyclone located between the top of the the reactor (1) and the connection of the line (5) with the line (9). The fluidised-bed reactor (1), provided with a fluidisation grid (4), consists essentially of a cylinder (2) of diameter 4.5 m, surmounted by a tranquillisation chamber (3). The total height of the reactor is about 30 m. The reactor (1) contains a fluidised-bed which is kept at 90° C. and which consists of a powder of 50 T of a high-density polyethylene (density 0.96) in the process of forming, in the form of particles with a weight-average diameter of 0.7 mm. The reactor (1) is fed with an ethylene prepolymer consisting of particles with a weight average diameter of 0.25 mm, prepared using the catalyst system of the Ziegler-Natta type described in Example 1 of French patent no. 2 405 961, which comprises a solid catalyst based on titanium, magnesium and chlorine, and a cocatalyst consisting of tri-n-octyl-aluminium, in amounts such that the atomic ratio Al/Ti is equal to 1 and such that the prepolymer contains 35 g of polyethylene per millimol of titanium.

A gaseous reaction mixture containing, by volume, 43% of ethylene, 33% of hydrogen, 16% of nitrogen, 3% of isopentane and 5% of ethane, under a total pressure of 2.3 MPa, rises through the fluidised bed at a speed of 0.5 m/s. The gaseous reaction mixture leaves through the top part of the reactor (1) at a temperature of 90° C. A line (5) for introducing liquid isopentane at ambient temperature (20° C.) opens into the recycling line (9), upstream of the first heat transfer means (6) and at a distance of 3m from the inlet of the latter. The mean residence time of the isopentane in the gaseous reaction mixture is less than 0.2 second before the inlet (17) of the first tube heat exchanger (6). The isopentane is partially liquid when it enters into the first tube heat exchanger (6). The liquid isopentane is introduced at a flow rate of 100 kg/h. The gaseous reaction mixture is cooled to a temperature of 47° C. by passage through the first heat transfer means (6), which is fed with water as the cooling fluid. The isopentane is completely vaporised, when it leaves the first heat transfer means (6). After it has been cooled a first time, the gaseous reaction mixture is compressed by means of compressor (7). The gaseous reaction mixture is then cooled again to a temperature of 33° C. by the second heat transfer means (8), which is fed with a water as the cooling fluid. The gaseous reaction mixture, now cooled to 33° C., is finally re-cycled through the pipe (13) into the bottom part of the reactor (1), situated underneath the fluidisation grid.

The ratio between the heat exchange surfaces of the first and second heat transfer means is 50/50. Furthermore, the operating conditions of these two heat transfer means are such that the ratio between the heat exchange capacities of the first and second heat transfer means is 70/30.

Under these conditions, the fluidised-bed reactor (1) operates continuously to produce about 13.5 T/h of a high-density polyethylene (density 0.96) without noticeable premature wear of the compressor (7) or any noticeable blocking of the heat transfer means (6) and (8), during about one year.

EXAMPLE 2

The process is carried out in an installation identical to that described in Example 1. The reactor (1) contains a fluidised bed which is kept at 82° C. and which consists of a powder of 50 T of a linear low-density polyethylene (density 0.92) in the process of forming, in the form of particles with a weight-average diameter of 0.7 mm. This reactor (1) is fed with a prepolymer identical to that used in Example 1. A gaseous reaction mixture containing, by volume, 37% of ethylene, 15% of but-1-ene, 5% of hydrogen, 38% of nitrogen and 5% of ethane, under a pressure of 2 Mpa, rises through the fluidised bed at a speed of 0.5 m/s. The gaseous reaction mixture leaves through the top part of the reactor (1) at a temperature of 82° C. A line for introducing liquid but-1-ene at ambient temperature (20° C.) opens into the recycling line (9), upstream of the first heat transfer means (6) and at a distance of 3m from the inlet of the latter. The mean residence time of but-1-ene in the gaseous reaction mixture is less than 0.2 second before the inlet (17) of the first tube heat exchanger (6). The but-1-ene is partially liquid, when it penetrates into the first tube heat exchanger (6). The liquid but-1-ene is introduced at a flow rate of 1100 kg/hr. The gaseous reaction mixture is cooled to a temperature of 59° C. in the first heat transfer means (6). After it has been cooled a first time, this gaseous reaction mixture is compressed by means of the compressor (7). It is then cooled again to a temperature of 42° C. by the second heat transfer means (8). The operating conditions of the two heat transfer means are such that the ratio between the heat exchange capacities of the first and second heat transfer means is 50/50. The gaseous reaction mixture, now cooled to 42° C., is finally recycled through the pipe (13) into the bottom part of the reactor (1), situated underneath the fluidisation grid.

Under these conditions, the fluidised-bed reactor (1) operates continuously to produce about 12.5 T/h of a linear low-density polyethylene (density 0.92) without noticeable premature wear of the compressor (7) or any noticeable blocking of the heat transfer means (6) and (8), during about one year.

We claim:

1. Apparatus for the gas phase polymerisation of olefin(s) comprising a fluidised bed reactor with a fluidisation grid located at the lower part of said reactor and a gas recycling line external to said reactor connecting the top to the bottom part of said reactor below said fluidisation grid for returning into said bottom part of the reactor the gaseous reaction mixture comprising the olefin(s) to be polymerised leaving said top of the reactor, said gas recycling line being provided with (i) a gas compressor, (ii) a first heat transfer means arranged between said top of the reactor and the suction side of said gas compressor, (iii) a second heat transfer means arranged between the delivery side of said gas compressor and said bottom part of the reactor, and (iv) the inlet of a means for introducing a readily volatile liquid hydrocarbon arranged in the entering of said first heat transfer means or at a point between said top of the reactor and said first heat transfer means in the vicinity of the entering of said first heat transfer means.

2. Apparatus according to claim 1, wherein the inlet of the means for introducing a readily volatile liquid hydrocarbon is located at a distance from the entering of the first heat transfer means such that the readily volatile liquid hydrocarbon is partially in the liquid state in said entering.

3. Apparatus according to claim 1, wherein the inlet of the means for introducing a readily volatile liquid hydrocarbon is located at a distance from the entering of the first heat transfer means such that the means residence time of the readily liquid hydrocarbon introduced into the gas recycling line is leass than 1 second to reach said entering.

4. Apparatus according to claim 1, wherein the inlet of the means for introducing a readily volatile liquid hydrocarbon is located at a distance from the entering of the first head transfer means which is of 0 to 20 meters.

5. Apparatus according to claim 4, wherein the distance from the entering of the first heat transfer means is of 0 to 10 meters.

6. Apparatus according to claim 1, wherein the fluidised bed reactor is surmounted by a tranquillisation chamber.

7. Apparatus according to claim 1, wherein the means for introducing a readily volatile liquid hydrocarbon opens directly into the entering of the first heat transfer means or into the gas recycling line at a point between the top of the fluidized bed reactor and the first heat transfer means so that the readily volatile liquid hydrocarbon is partially in the liquid state in said entering.

* * * * *

UNITED STATES PATENT AND TRADEMARK OFFICE
CERTIFICATE OF CORRECTION

PATENT NO. : 5,266,276
DATED : November 30, 1993
INVENTOR(S) : JEAN-CLAUDE CHINH and ANDRE DUMAIN It is certified that error appears in the above-indentified patent and that said Letters Patent is hereby corrected as shown below:

Col. 1, l. 26, correct the spelling of the word "less"

Col. 4, l. 26, should read "mm"

Col. 8, Example 2, l. 67, should read "MPa,"

Signed and Sealed this

Twelfth Day of July, 1994

Attest:

BRUCE LEHMAN

*Attesting Officer*  *Commissioner of Patents and Trademarks*